United States Patent [19]

Hutchin

[11] Patent Number: 4,518,854
[45] Date of Patent: May 21, 1985

[54] COMBINED SHEARING INTERFEROMETER AND HARTMANN WAVEFRONT SENSOR

[75] Inventor: Richard A. Hutchin, Marlboro, Mass.

[73] Assignee: Itek Corporation, Lexington, Mass.

[21] Appl. No.: 389,330

[22] Filed: Jun. 17, 1982

[51] Int. Cl.³ .............................................. G01J 1/20
[52] U.S. Cl. ..................................... 250/201; 356/354
[58] Field of Search ........................... 250/201, 231 R; 356/353, 354

[56] References Cited

U.S. PATENT DOCUMENTS

| 3,829,214 | 8/1974 | Wyant | 356/354 |
|---|---|---|---|
| 3,923,400 | 12/1975 | Hardy | 356/353 |
| 4,141,652 | 2/1979 | Feinleib | 250/201 |
| 4,441,019 | 4/1984 | Hardy | 250/201 |

Primary Examiner—David C. Nelms
Assistant Examiner—J. J. Brophy
Attorney, Agent, or Firm—Robert F. Rotella; Michael H. Wallach

[57] ABSTRACT

A sensitive wavefront sensor combining attributes of both a Hartmann type of wavefront sensor and an AC shearing interferometer type of wavefront sensor. An incident wavefront, the slope of which is to be detected, is focussed to first and second focal points at which first and second diffraction gratings are positioned to shear and modulate the wavefront, which then diverges therefrom. The diffraction patterns of the first and second gratings are positioned substantially orthogonal to each other to shear the wavefront in two directions to produce two dimensional wavefront slope data for the AC shearing interferometer portion of the wavefront sensor. First and second dividing optical systems are positioned in the two diverging wavefronts to divide the sheared wavefront into an array of subapertures and also to focus the wavefront in each subaperture to a focal point. A quadrant detector is provided for each subaperture to detect the position of the focal point therein, which provides a first indication, in the manner of a Hartmann wavefront sensor, of the local wavefront slope in each subaperture. The total radiation in each subaperture, as modulated by the diffraction grating, is also detected by the quadrant detector which produces a modulated output signal representative thereof, the phase of which relative to modulation by the diffraction grating provides a second indication of the local wavefront slope in each subaperture, in the manner of an AC shearing interferometer wavefront sensor. The data from both types of sensors is then combined by long term averaging thereof to provide an extremely sensitive wavefront sensor.

4 Claims, 4 Drawing Figures (PRIOR ART-HARTMANN WAVEFRONT SENSOR)

(PRIOR ART-SHEARING INTERFEROMETER WAVEFRONT SENSOR)

COMBINED SHEARING INTERFEROMETER AND HARTMANN WAVEFRONT SENSOR

BACKGROUND OF THE INVENTION

Field of the Invention

The present invention relates generally to a wavefront sensor for detecting wavefront slopes or tilts along two orthogonal directions, and more particularly pertains to a simple, while light wavefront sensor of the aforementioned type which is particularly sensitive and suitable for use in a real-time image compensation system.

The field of active optics technology can be applied to high performance optical systems which encounter or are subject to random disturbances such as vibration, thermal transients or atmospheric turbulence. Active optics technology can be applied to laser beam control systems and compensated imaging systems. For instance, concerning the latter types of systems, the resolution of ground based optical imaging systems is frequently severely limited by random wavefront tilts and phase changes produced by atmospheric turbulence. The resolution of such optical systems can usually be improved considerably if the atmospheric distortion is measured and corrected in real-time before recording the image on tape or film.

The pertinent prior art to the present invention is discussed, infra, with reference to the prior art systems illustrated in FIGS. 1 and 2, and accordingly is not being reviewed further in this section.

SUMMARY OF THE INVENTION

Accordingly, it is a primary object of the present invention to provide a very sensitive wavefront sensor in a system combining attributes of both a Hartmann type of wavefront sensor and a shearing interferometer type of wavefront sensor.

A further object of the subject invention is the provision of a wavefront sensor of the aforementioned type wherein data from both types of sensors can be combined in long term averaging thereof.

In accordance with the teachings herein, the present invention provides a wavefront sensor for generating two substantially independent indications of the slope of an incident wavefront thereby providing a comparatively sensitive instrument. An incident wavefront, the slope of which is to be detected, is focussed to a focal point at which a first diffraction grating is positioned to shear and modulate the wavefront, which then diverges therefrom. A dividing optical system is positioned in the diverging wavefront to divide the sheared wavefront into an array of subapertures and also focuses the wavefront in each subaperture to a focal point. A positional photodetector is provided for each subaperture to detect the position of the focal point therein which provides a first indication of the local wavefront slope in each subaperture. The total radiation in each subaperture, as modulated by the diffraction grating, is also detected. A modulated output signal representative thereof is produced, and the phase of this signal relative to modulation by the diffraction grating provides a second indication of the local wavefront slope in each subaperture. Accordingly, two substantially independent indications of the local slope of the wavefront in each subaperture are obtained to provide a comparatively sensitive wavefront sensor.

In a preferred embodiment, each positional photodetector comprises a quadrant detector having four symmetrically positioned photodetectors, each providing a separate output signal. The output signals of opposed pairs of the photodetectors are differentially combined to determine the position of the focal point, and the total radiation in each subaperture is detected by summing the four output signals of the four photodetectors.

The shearing interferometer portion of the wavefront sensor described above provides information on the wavefront slope only in the direction of shearing thereof. Two dimensional shearing information on the wavefront slope is obtained by providing a second diffraction grating at a second focal point of the wavefront, with the second diffraction grating having its grating pattern positioned substantially orthogonal to the grating pattern of the first diffraction grating. A second dividing optical system is positioned in the diverging wavefront beyond the second diffraction grating to divide the sheared wavefront into a second array of subapertures and also focuses the wavefront in each subaperture to a focal point. The position of the focal point and the total radiation in each subaperture are then detected and processed in exactly the same manner as described above, thereby yielding two dimensional shearing interferometric data on the incident wavefront.

BRIEF DESCRIPTION OF THE DRAWINGS

The foregoing objects and advantages of the present invention for a combined shearing interferometer and Hartmann wavefront sensor may be more readily understood by one skilled in the art with reference being had to the following detailed description of several preferred embodiments thereof, taken in conjunction with the accompanying drawings, in which.

DETAILED DESCRIPTION OF THE DRAWINGS

Figure 1:
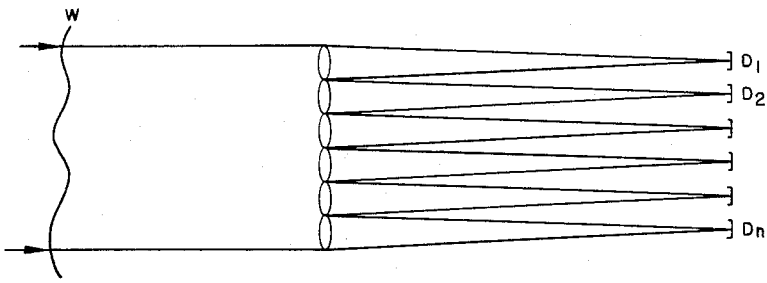
FIG. 1 is an elevational view of a prior art Hartmann type of wavefront sensor.

Referring to the drawings in detail, FIG. 1 illustrates a known prior art wavefront sensing system in which the incoming wavefront is divided into a number of subapertures, over each of which the dominant wavefront distortion is a first-order tilt. The use of a two dimensional array of quadrant detectors $D_n$ enables the local tilts to be measured efficiently, and the original wavefront is then reconstructed by piecing together the individual subaperture tilts. This approach is in fact a variation of the classic method of testing large optical objectives, known as the Hartmann test. In this test, a mask pierced with multiple holes is placed over the optical aperture which is illuminated with light from a distant point source. The converging light passing through these subapertures is intercepted near the image plane, at a location where the pencils of light are still separated, and recorded on film. Measurement of the locations of the centroids of the images then reveals the local tilt of the wavefront passing through each hole. From these measurements, the overall figure of the objective may be determined.

For real-time wavefront correction systems, a Hartmann mask covering the primary aperture cannot be used, and the subaperture separation must be implemented within the wavefront sensor itself. FIG. 1 illustrates one approach to subaperture separation using individual subaperture objectives O, but many other variations are possible using combinations of lenses, mirrors, and prisms. In the detector plane, an array of quadrant elements is required, one for each subaperture, to detect the locations of the centroids of the images. An imaging Hartmann wavefront sensor is theoretically very efficient when used with unresolved reference sources. However, it suffers from the same problems as other tilt tracking sensors with resolvable images if there is local wavefront curvature within each subaperture. These problems can in principle be alleviated by using multiple-element detectors and by designing the size of the subapertures small enough to eliminate local wavefront curvature.

A major problem with an imaging Hartmann sensor is the achievement of the necessary alignment of the optical components and the detector array. The quasi-linear range of subaperture tilt measurement, for an unresolved source, is determined by the location of the first zero in the intensity function in the detector plane, which occurs at an image displacement of $\pm\lambda F/a$, equivalent to a tilt of one wave across the subaperture. A common requirement for measurement accuracy in optical instruments is $\pm 1/10$ wavelength. In the visible band at $\lambda = 0.5$ µm with a focal length F of 1 m, and a subaperture of 0.05 m, a wavefront tilt of $\lambda/10$ corresponds to an image displacement of only 1 µm at the detector. Maintaining this alignment in a practical system is a difficult problem. These requirements may be considerably eased by using a single optical system common to all detector elements, thereby eliminating the differential alignment problem typical of a Hartmann sensor.

Figure 2:
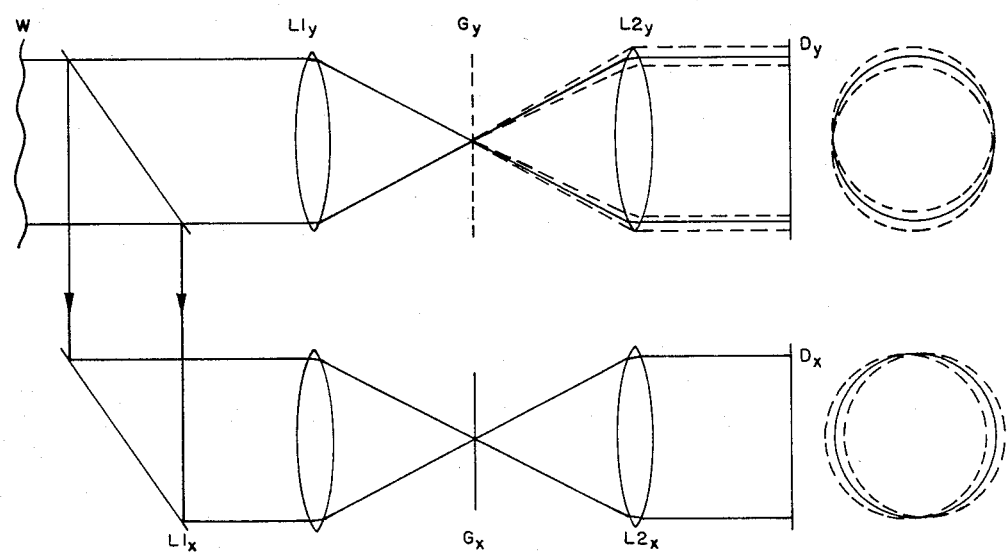
FIG. 2 illustrates a prior art AC shearing interferometer type of wavefront sensor.

The pursuit of high optical efficiency combined with the simplicity of a grating lateral shear interferometer led to the development of a variable-shear AC interferometer using a double frequency diffraction grating, as disclosed by Hardy U.S. Pat. No. 3,923,400. This interferometer uses the principle that with AC heterodyne detection, it is possible to separate the desired interference orders electrically from undesired orders, provided the modulation frequencies are different. Optical separation of the multiple interference orders, using a double frequency grating, is necessary for static interferograms examined visually, but is not required with AC heterodyne detection. A low-frequency square-wave grating (similar to a Ronchi ruling) is ideal for this purpose because the mean position of the fringes produced by interference between the zero order and the symmetrically disposed +1 and −1 order sidebands does not shift with optical wavelength. As a result, for small aberrations, the interferometer is inherently achromatic. In addition, the use of a radial (sunburst) grating enables the grating frequency, and consequently the shear distance, to be varied by changing the radius at which the reference image falls on the grating. The configuration of this AC radial grating interferometer is shown in FIG. 2. The incoming wavefront W is amplitude divided into two beams, and imaged by the lens systems $L1_x$, $L2_x$, and $L1_y$, $L2_y$ onto the detector planes $D_x$ and $D_y$. Each point on W is, therefore, mapped onto corresponding locations on both $D_x$ and $D_y$. The distant reference source is imaged by $L1_x$ and $L1_y$, respectively, onto the gratings $G_x$ and $G_y$. The lines of these gratings are, respectively, horizontal and vertical at the point where they cross the optical axes. The grating produces multiple overlapping images of the incident wavefront at the detector planes. With a symmetrical square-wave grating, the even order sidebands are suppressed. The angular separation or shear $\theta_s$ between the overlapping images is given by $$\sin \theta_s = \pm n\lambda v$$

where n = 1,3,5, etc., $\lambda$ is the optical wavefront, and $v$ is the grating spatial frequency.

If the local slope of the incoming wavefront at any point is $\alpha(x)$, then the phase difference between the sheared wavefronts in the corresponding location in the detector plane is $$\phi(x) = \alpha(x)\frac{S}{\lambda}$$

where the shear distance S is given by $S = \theta_s F$, and F is the focal length of lens L2. The phase difference between the sheared beams produces interference which modifies the intensity of the light allowing the phase difference to be detected. It should be noted that S is proportional to the optical wavelength $\lambda$, so that the interference phase angle $\phi(x)$ is proportional to the wavefront slope (a dimensionless quantity) independent of the optical wavelength. The system, therefore, operates in white light.

As the gratings rotate, the intensity at each point in the detector planes is modulated, producing an alternating current (AC) signal at the output of each detector. The fundamental frequency of this signal is given by $$\omega_o = V_g v$$

where $V_g$ is the grating velocity. Interference between the zeroth-order, and each of the first-order sidebands produces modulation at frequency $\omega_o$, and because the even order sidebands are suppressed, all other interference produces are at $2\omega$ or higher. Thus the desired modulated sidebands can be electrically filtered to produce a signal $$I_{(x,t)} = A\left[\frac{1}{2} + \gamma\frac{2}{\pi}\cos(wt + \phi(x))\right]$$

where $\gamma$ is the modulation index (or interference fringe contrast), determined by the spatial coherence of the reference source. The fundamental grating reference frequency $\omega$ may be detected directly from the grating using an auxilliary optical system. This reference frequency is then used to demodulate the signal $I_{(x,t)}$ to extract the phase angle $\phi(x)$ from which the wavefront slope is detected. In practice, an array of photoelectric detectors is used in the planes $D_x$ and $D_y$ to measure the local wavefront slopes in the x and y directions in all parts of the aperture simultaneously.

The use of a detector to generate a phase reference signal directly from the grating motion provides a further advantage when AC heterodyne detection is used as it is then possible to detect changes in the tilt of the wavefront. Wavefront tilt produces a change in the position of the image of the distant source relative to that of the fixed grating reference, thereby producing a phase shift in the detected signal in all channels. When this constant phase difference is reconstructed, it is equivalent to an overall wavefront tilt.

Bearing in mind the above explanation of a Hartmann wavefront sensor and on AC shearing interferometer wavefront sensor, the present invention proceeds with the recognition that the light efficiencies of these prior art approaches can be substantially doubled with a wavefront sensor in which the wavefront incident thereon is detected in a sensor incorporating both prior art approaches. Essentially, the present invention modifies a standard AC shearing interferometer to incorporate therein a detector array which simultaneously allows the sensor to function as a Hartmann type of sensor. This approach results in an amplitude modulated Hartmann sensor wherein both the phase relationship and the position of each focused subaperture image indicate the local slope of the wavefront across the subaperture. In this approach, each photon of the wavefront is encoded in both time and space, thereby doubling the amount of information available on the slope of the wavefront.

Figure 3:
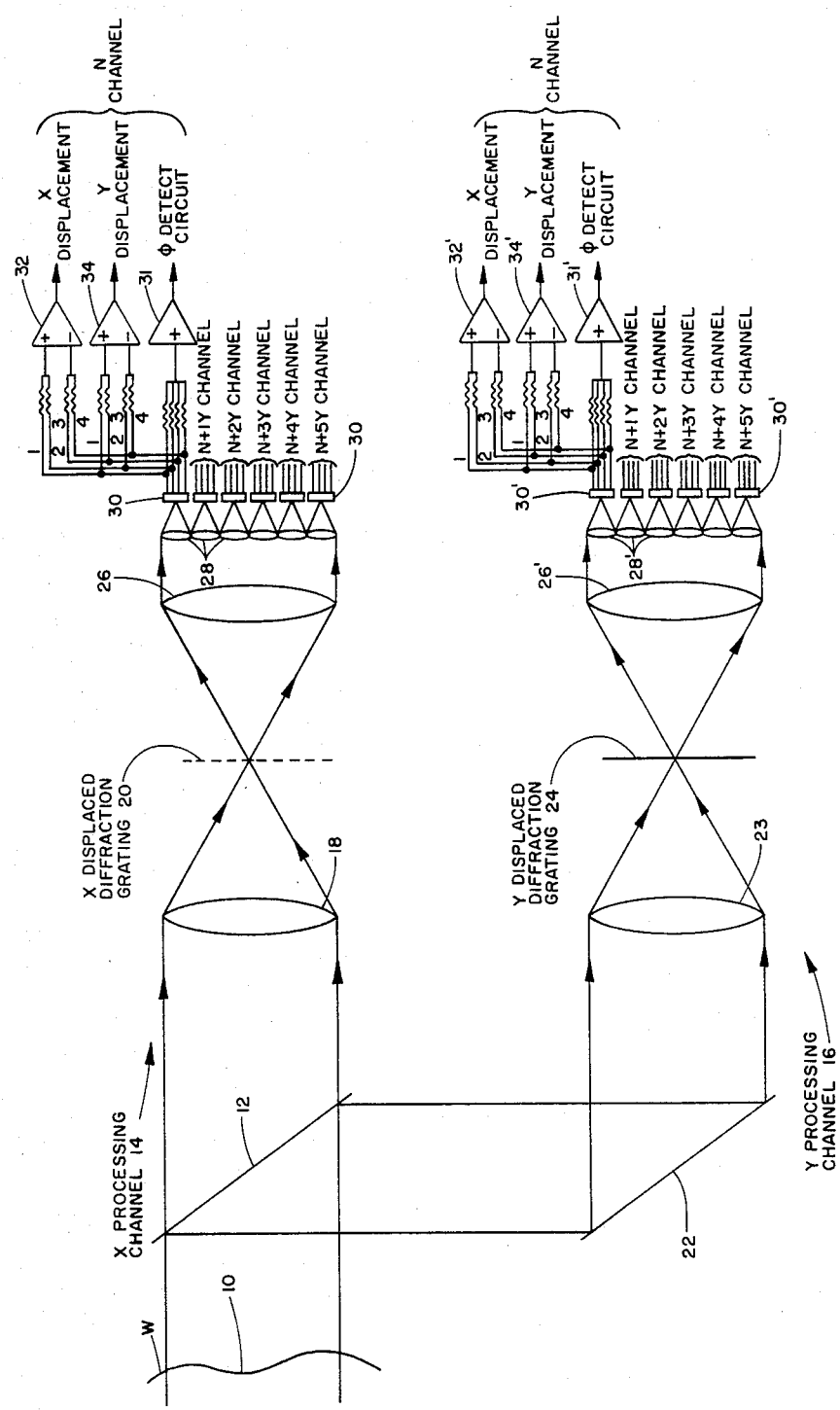
FIG. 3 illustrates an optical and electrical schematic of an exemplary embodiment of the present invention which advantageously combines features of both Hartmann and shearing interferometer types of wavefront sensors.

Referring to FIG. 3 for a further explanation of the present invention, an input wavefront 10 is incident upon a beam splitter 12 which allows approximately half the wavefront to pass therethrough to an x processing channel 14 and reflects approximately half the wavefront to a y processing channel 16. In the x processing channel 14, the wavefront is incident upon an x focusing optical system 18, which can be either refractive or reflective, and which functions to focus the wavefront to its focal point, at which an x diffraction grating 20 is positioned. The focused wavefront is sheared in an x direction by the x diffraction grating 20, which is preferably a rotationally mounted grating.

Similarly, in the y processing channel 16, the wavefront is reflected by a mirror 22, onto a y focusing optical system 23, which can also be either refractive or reflective, and which functions to focus the wavefront to its focal point, at which a y diffraction grating 24 is positioned. The focused wavefront is sheared in a y direction by the diffraction grating 24, which is also preferably a rotationally mounted grating. The y diffraction grating 24 has its diffraction pattern positioned substantially orthogonally to that of the x diffraction grating 20 at the point of shearing such that the wavefront is effectively sheared in two orthogonal directions to yield two dimensional wavefront information in two orthogonal directions. In alternative embodiments, the diffraction gratings 20 and 24 might be the same rotating diffraction grating with the two focused wavefronts being incident thereon at 90° displaced positions, or could be linearly oscillated gratings.

The explanation now proceeds with reference to the x processing channel 14, it being noted that the y processing channel 16 is substantially identical, and accordingly the elements therein are identically numbered with a prime (') notation. The sheared wavefront then diverges from diffraction grating 20 to a collimating lens 26 which directs a collimated beam onto a six by six array of lenslets 28, each of which defines a subaperture for the wavefront. Each lenslet 28 focuses the wavefront in its subaperture onto a quadrant (quad) detector 30 associated therewith. Each quad detector includes four symmetrically placed photodetectors, one in each quadrant (1,2,3,4), two in y and two in x, as is well known in the art. Each quad detector is symmetrically positioned relative to its corresponding lenslet 28 such that a plane undistorted wavefront results in the focal point being positioned in the center of the four photodetectors which produce four equal, balanced signals from the quad detector, but a local slope in the wavefront in x or y will result in a proportional imbalance in the signals produced by the quad detector.

For the shearing interferometer portion of the system, the four signals are summed in a summing amplifier 31, and the resultant output signal represents the total radiation in that subaperture as sheared and modulated by the diffraction grating, which signal is then processed to detect relative phase displacements in the subaperture wavefronts in a manner as is known in the AC shearing interferometer arts. Hardy U.S. Pat. No. 3,923,400, Wyant U.S. Pat. No. 3,829,219 and Hardy U.S. patent application Ser. No. 343,653 (attorney's dockets I-572, 3678), particularly FIG. 6 thereof, are instructional in the detection of these relative phase displacements.

For the Hartmann sensor portion of the system, the output signals from the appropriate opposed pairs of the photodetectors are differentially combined to determine the position of the focal point in each subaperture. Thus, for the x displacement, the signals from the 1 and 2 photodetectors are summed and applied to the positive input terminal of a differential amplifier 32, while the signals from the 3 and 4 photodetectors are summed and applied to the negative input terminal of differential amplifier 32. For the y displacement, opposite pairings of the signals are proper, and the signals from the 1 and 3 photodetectors are summed and applied to the positive input terminal of a differential amplifier 34, while the signals from the 2 and 4 photodetectors are summed and applied to the negative input terminal of differential amplifier 34. Thus the positive or negative signal of differential amplifier 32 is proportional to the positive or negative x displacement of the focal point in the subaperture channel N, while the positive or negative signal of differential amplifier 34 is proportional to the positive or negative y displacement of the focal point in the subaperture channel. The signals of the quad detectors for the other subapertures in the six by six quad detector array in the x processing channel 16 are processed in a similar manner, and likewise the signals of the quad detectors for the six by six quad detector array in the y processing channel 18 are also processed in a similar manner.

The data on the wavefront slope derived from the Hartmann sensor portion of the system can then be combined with the data on the wavefront slope derived from the shearing interferometer portion of the system to overcome the inherent instability of a typical Hartmann sensor wherein the quad cell positioning may change significantly with time or system orientation. By comparing the data from the Hartmann sensor portion of the system with the data available from the shearing interferometer portion, the data available from the shearing interferometer portion, the data from the Hartmann sensor portion can be calibrated using a long term average ($\approx 0.1$ to 0.2 seconds) of the two sets of data.

Figure 4:
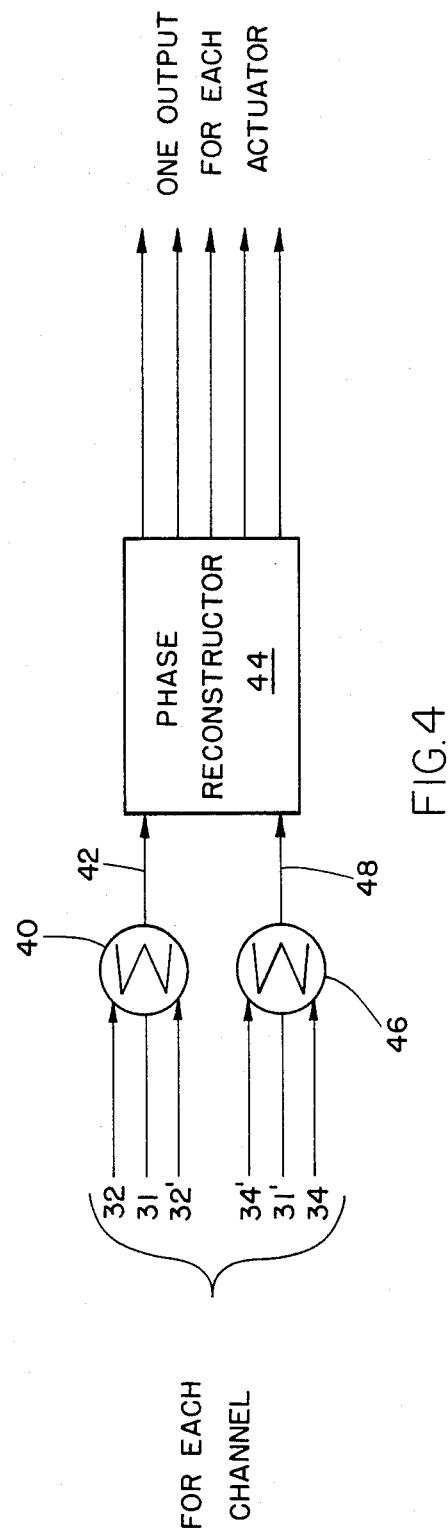
FIG. 4 is an exemplary embodiment of a processing circuit for the signals obtained from the wavefront sensor of FIG. 3.

FIG. 4 illustrates one exemplary relatively simple processing circuit for the signals derived from the arrangement of FIG. 3, although it should be realized that other processing approaches are also possible for these signals. In the approach illustrated in FIG. 4, for each channel, the x displacement signals are summed in an x summing circuit 40 to produce a composite x signal on line 42 which is directed to a phase reconstructor 44. Among the x displacement signals, signal 32 represents an x spatial displacement signal, signal 31 represents an x temporal displacement signal, and signal 32' represents a further x spatial displacement signal. Also, for each channel, the y displacement signals are summed in a y summing circuit 46 to produce a composite y signal on line 48 which is also directed to the phase reconstructor 44. Among the y displacement signals, signal 34' represents a y spatial displacement signal, signal 31' represents a y temporal displacement signal, and signal 34 represents a further y spatial displacement signal. Thus, the phase reconstructor receives signals from summing amplifiers 40 and 46 for each channel and then reconstructs the phase relationships between the different areas of the wavefront, and produces one output signal for each separate actuator in a wavefront corrector, as is known in the art and accordingly will not be discussed in detail herein.

Although the illustrated embodiment utilizes two six by six arrays of quad cells, depending upon the particular system application either a smaller or larger array of detectors can be employed. Moreover, although the illustrated embodiment utilizes an array of lenslets to form an array of subaperture objectives, other variations of subaperture separation are possible using various combinations of lenses, mirrors and prisms.

While several embodiments and variations of the present invention for a more sensitive wavefront sensor are described in detail herein, it should be apparent that the disclosure and teachings of the present invention will suggest many alternative designs to those skilled in the art.

What is claimed is:

1. A wavefront sensor for generating two substantially independent indications of the slope of an incident wavefront, thereby providing a comparatively sensitive wavefront sensor, comprising:
   a. focusing means for focusing an incident wavefront, the slope of which is to be detected, to a focal point;
   b. a first diffraction grating, positioned substantially at the focal point of said focusing means, for shearing and modulating the focused wavefront, which then diverges beyond the focal point;
   c. first optical means, positioned in the diverging wavefront beyond the focal point at said first diffraction grating, for dividing the sheared wavefront into an array of subapertures, the local slope of each of which is to be determined, and for focusing the wavefront in each subaperture to a focal point;
   d. first means for detecting the position of the focal point in each subaperture, which is indicative of the local wavefront slope in that subaperture, and for producing a positional output signal representative thereof; and
   e. first means for detecting the radiation in each subaperture as modulated by said first diffraction grating and for producing a modulated output signal representative thereof, the phase of which relative to modulation by the first diffraction grating is also indicative of the local slope in that subaperture, whereby two substantially independent indications of the local slope of the wavefront in each subaperture are obtained to provide a comparatively sensitive wavefront sensor.

2. A wavefront sensor as claimed in claim 1, said first means for detecting the position of the focal point in each subaperture comprising a quadrant detector for each subaperture, each quadrant detector having four symmetrically positioned photodetectors, each producing a separate output signal and the output signals of opposed pairs of the photodetectors being differentially combined to determine the position of the focal point, and said first means for detecting the radiation in each subaperture also comprises the quadrant detector for that subaperture in which the output signals of the four photodetectors are summed together.

3. A wavefront sensor as claimed in claim 1, further including:
   a. a second diffraction grating positioned substantially at the focal point of said optical means for shearing and modulating the focused wavefront, which then diverges beyond the focal point, said second diffraction grating having its grating pattern positioned substantially orthogonal to the grating pattern of said first diffraction grating;
   b. a second optical means, positioned in the diverging wavefront beyond the focal point at said second diffraction grating, for dividing the sheared wavefront into an array of subapertures, the local slope of each of which is to be determined, and for focusing the wavefront in each subaperture to a focal point;
   c. a second means for detecting the position of the focal point in each subaperture, which is indicative of the local wavefront slope in that subaperture, and for producing a positional output signal representative thereof; and
   d. a second means for detecting the radiation in each subaperture as modulated by said second diffraction grating and for producing a modulated output signal representative thereof, the phase of which relative to modulation by the second diffraction grating is also indicative of the local slope in that subaperture, whereby two substantially independent indications of the local slope of the wavefront in each subaperture are obtained to provide a comparatively sensitive wavefront sensor.

4. A wavefront sensor as claimed in claim 3, said first and second means for detecting the position of the focal point in each subaperture comprising a quadrant detector for each subaperture, each quadrant detector having four symmetrically positioned photodetectors, each producing a separate output signal and the output signal of opposed pairs of the photodetectors being differentially combined to determine the position of the focal point, and said first and second means for detecting the radiation in each subaperture also comprises the quadrant detector for that subaperture in which the output signals of the four photodetectors are summed together.

* * * * *